United States Patent
Zambetti et al.

(10) Patent No.: US 7,885,088 B2
(45) Date of Patent: Feb. 8, 2011

(54) METHOD FOR CONTROLLING A MULTIPHASE INTERLEAVING CONVERTER AND CORRESPONDING CONTROLLER

(75) Inventors: Osvaldo Zambetti, Milan (IT); Alessandro Zafarana, Milan (IT)

(73) Assignee: STMicroelectronics S.r.l., Agrate Brianza (MI) (IT)

( * ) Notice: Subject to any disclaimer, the term of this patent is extended or adjusted under 35 U.S.C. 154(b) by 834 days.

(21) Appl. No.: 11/680,250

(22) Filed: Feb. 28, 2007

(65) Prior Publication Data

US 2007/0229048 A1 Oct. 4, 2007

(30) Foreign Application Priority Data

| Feb. 28, 2006 | (EP) | ................... 06425131 |
| Feb. 28, 2006 | (EP) | ................... 06425132 |
| Feb. 28, 2006 | (EP) | ................... 06425133 |

(51) Int. Cl.
*H02J 1/10* (2006.01)
*G05F 1/00* (2006.01)

(52) U.S. Cl. ........................................ 363/65; 323/282
(58) Field of Classification Search ................ 232/222, 232/272, 282–284; 363/65, 72
See application file for complete search history.

(56) References Cited

U.S. PATENT DOCUMENTS

| 5,870,296 A | * | 2/1999 | Schaffer .................... 323/282 |
| 6,362,608 B1 | | 3/2002 | Ashburn et al. |
| 6,510,065 B1 | | 1/2003 | Massie et al. |
| 6,628,106 B1 | * | 9/2003 | Batarseh et al. ............ 323/222 |
| 2004/0095104 A1 | | 5/2004 | Brooks |

FOREIGN PATENT DOCUMENTS

WO    WO 02/19507    3/2002

OTHER PUBLICATIONS

Zambetti, et al., "Load Transient Boost Applied to Multiphase DC-DC Converters", *Electronics World*, May 2006, pp. 40-45.
European Search Report dated Sep. 13, 2006 for European Application No. 06 42 5132.

* cited by examiner

*Primary Examiner*—Bao Q Vu
*Assistant Examiner*—Jue Zhang
(74) *Attorney, Agent, or Firm*—Lisa K. Jorgenson; Stephen Bongini; Fleit Gibbons Gutman Bongini & Bianco P.L.

(57) ABSTRACT

A method is provided for controlling a converter of the multiphase interleaving type. According to the method, there is detected when a change of the load applied to an output terminal of the converter occurs. All the phases of the converter are simultaneously turned on, and a driving interleaving phase shift is recovered to restart a normal operation of the converter. A controller for carrying out such a method is also provided.

19 Claims, 13 Drawing Sheets

METHOD FOR CONTROLLING A MULTIPHASE INTERLEAVING CONVERTER AND CORRESPONDING CONTROLLER

CROSS-REFERENCE TO RELATED APPLICATIONS

This application claims priority from European Patent Application No. 06 425 132.5, filed Feb. 28, 2006, European Patent Application No. 06 425 133.3, filed Feb. 28, 2006, and European Patent Application No. 06 425 131.7, filed Feb. 28, 2006. The entire disclosures of these three European patent applications are herein incorporated by reference.

Additionally, this application is related to the applications "METHOD FOR CONTROLLING A MULTIPHASE INTERLEAVING CONVERTER AND CORRESPONDING CONTROLLER,", Ser. No. 11/680,581, and "METHOD FOR CONTROLLING A MULTIPHASE INTERLEAVING CONVERTER AND CORRESPONDING CONTROLLER,", Ser. No. 11/680,586, which were filed on the same day as the present application and commonly assigned herewith to STMicroelectronics S.r.l. These related applications are herein incorporated by reference.

FIELD OF THE INVENTION

The present invention relates to a method for controlling a multiphase interleaving converter and a corresponding controller, and more particularly relates to a method for controlling a converter of the multiphase interleaving type in the case of sudden changes of an associated load.

BACKGROUND OF THE INVENTION

As is known, the evolution of the electrical features of the processors for PCs, workstations and servers obliges manufacturers to find new solutions to meet the requirements demanded by central processing units (or CPUs).

In particular, CPUs of the new generation require a high precision in their supply voltage, equal for example to +/−0.8% in the steady state and +/−3% in the transient state.

Next to these requirements for precision, the supply voltages that are used decrease to 1.1V and the load currents rise to 130 A with edges of 100 A/μs, with a requirement for efficiency higher than 80%.

Therefore, suitable current or voltage controller devices must be used, which are able to ensure the efficiency required. A controller device suitable for CPU applications comprises for example a converter of the DC-DC interleaving type, used as an economic and efficient solution to meet the above needs and obtained by connecting, in parallel, N DC-DC converters in a Buck or Step-down configuration (i.e., by connecting their input and output terminals to each other driven in interleaved mode).

A known converter of the DC-DC interleaving type is shown in FIG. 1A. The converter 1 comprises a controller 2 connected to a plurality of n buffers or phases 3 (multiphase configuration) essentially comprising pairs of switches (High Side and Low Side), driven by the controller 2 so as to supply the required power to a CPU 4, which is connected to the output terminal OUT of the converter 1.

The interleaving driving of the converter 1 also implies that the controller 2 turns on the High Side switches of the n phases with a phase shift equal to the switch period T divided by the number n of phases.

A multiphase interleaving converter 1 is shown in greater detail in FIG. 1B. In particular, the converter 1 comprises n phases (indicated in the figure by their inductors L1 to Ln), with each phase 3 comprising a High Side switch SWhs connected in series to a Low Side switch SWls between a first and a second voltage reference, in particular an input voltage Vin and ground GND.

Each phase 3 also comprises an inductor L connected to a switch node X, or phase node that is between the switches SWhs and SWls. The converter 1 also comprises an output capacitor Cout inserted between the output terminal OUT and ground GND. Across the capacitor Cout there is an output voltage value Vout which is applied to the CPU 4.

The controller 2 supplies a driving signal of the PWM type for the High Side SWhs and Low Side SWls switches of the phases 3, which are sensitive to the level of the signal PWM. In particular, the High Side switches and the Low Side switches are respectively on and off if PWM=1, and the High Side switches and the Low Side switches are off and on respectively if PWM=0. To achieve this, the controller 2 comprises a suitable modulator 5.

In recent years, processors have been required to have their current specifications summarized in the underlying type of table.

TABLE 1

|  | 2004A | 2004B | 2004C | 2005A | 2005B | 2006A |
|---|---|---|---|---|---|---|
| IMAX | 78A | 119A | 112A | 100A | 125A | 65A |
| ISTEP | 55A | 95A | 89A | 65A | 95A | 40A/60A |
| Istep/Trise | 69A/ms | 119A/ms | 111A/ms | 217A/ms | 317A/ms | 1200A/ms |
| IDCmin | 5A | 5A | 5A | 5A | 5A | 5A |
| ITDC | 68A | 101A | 96A | 85/A | 115A | 56A |
| I_RISE | 800 nsec | 800 nsec | TBD/04_A | 310 nsec | 310 nsec | 50 nsec |

It should be noted that the increase in the required maximum currents (IMAX) stopped in 2005 and a decrease is foreseen in 2006 passing from about 125 A to 65 A. Such a decrease in the required maximum current would lead towards converter designs using a lower number of phases with respect to the preceding years.

In parallel, a very strong increase in the current demand rate of the processors (Istep/Irise) occurs, which greatly complicates the design of the DC-DC interleaving converters: the rate value Istep/Irise passes in fact from 69 A/ms (value in 2004) to the foreseen value of 1200 A/ms in 2006.

In other words, DC-DC interleaving converters of the next generation are required to meet more and more sudden load changes (or Load Transients).

All this implies an increase in the costs of these converters for which the number of output capacitors Cout and thus the number n of phases of the converter itself is to be increased to respect the required voltage tolerances.

In particular, if up to now the number n of phases has been selected on the basis of efficiency, temperature of the components (i.e., reliability) and power density requirements, in the following years the number of phases will be established also on the basis of the required current speed specifications to be achieved.

Increasing the number of phases is in fact a way to increase the response speed of the converter.

Clearly, in the case of current changes equal to 70 A in a range of 50 ns, only an adequate number of ceramic capacitors can limit the voltage fall of the processor in the first 50 ns of the load transient.

In fact, the regulator has a band, which is proportional to n×Fsw, with n being the number of phases of the converter and Fsw being the switching frequency, in general about 300 kHz. Thus, there are obtained response times which are in inversely proportional to the band (for example, for n=4 a response time of about 800 ns is obtained).

The converter and its response speed can thus heavily influence its manufacturing cost and the number of electrolytic capacitors to be used (which influence the output voltage fall for the processor over longer times than for the ceramic capacitors).

Further, the band and response speed of the converter are however two indexes that no longer function for load transients as short as 50 ns, which cannot be considered a "small signal" shifting any more since the reaction times of the closed loop system (i.e., the band) are greater by at least one order of magnitude.

The known solutions aim at improving the response times of the controller without for this reason influencing its band.

An example of this known type of solution is shown in FIG. 2.

The controller 20 has a terminal OUT for its connection with a CPU, whereon there is a voltage signal Vout. The terminal OUT is connected to a first inner terminal FB by a resistor Rfb, and an error amplifier EA has a first input terminal, in particular an inverting one, connected to the first inner terminal FB as well as to a first current generator Gdroop for supplying this first input terminal of the error amplifier EA with a voltage value Idroop equal to $K^*I_{TOT}$, with K being a suitable scale factor and $I_{TOT}$ being a total current value flowing in the inductors of the phases of the converter to which the controller 20 is connected.

The error amplifier EA has a second input terminal, in particular a non-inverting one, that receives a reference voltage Ref, as well as an output terminal connected to a second inner terminal COMP of the controller 20, which is, in turn, feedback connected to the first inner terminal FB by the series made of a resistor Rf and of a capacitor Cf.

The second inner terminal COMP is connected to a plurality of control modules 21, in parallel to each other, and each having an output terminal O connected to a phase of the converter.

In particular, each control module 21 is inserted between a first and a second voltage reference, in particular a supply voltage Vdd and ground GND, and is connected to the second inner terminal COMP.

A generic control module 21 comprises a resistor Rs and a capacitor Cs, which are inserted in parallel between the second inner terminal COMP and an inner node Y of the control module, which is, in turn, connected to ground GND by a biasing generator Gp, which supplies a current value equal to $K^*I_L$, where K is the scale factor and $I_L$ is a value of the current flowing in the inductor L of the phase that is connected to the control module 21.

The control module 21 also comprises an input generator Gi, which is inserted between the supply voltage reference Vdd and the inner node Y, and is suitable for supplying a current value equal to $K^*I_{AVG}$, where K is the scale factor and $I_{AVG}$ is a mean value of the currents flowing in the inductors L of the phases of the converter.

The inner node Y is also connected to a first input terminal, in particular a non-inverting one, of an operational amplifier OA of the control module 21, which also has a second input terminal, in particular an inverting one, which receives a ramp signal RAMP (having frequency Fsw), and an output terminal O, which is connected to a corresponding phase of the converter and supplies this phase with a driving signal PWM.

To improve the response time of the controller 20 without modifying its band, a supplemental capacitor Cd is inserted between the first inner terminal FB and the terminal OUT, in parallel to the resistor Rfb.

In this way, when there is a particularly quick Load Transient, this supplemental capacitor Cd becomes a much smaller impedance than the resistor Rfb resulting in the voltage value at the first inner terminal FB being no longer latched at a value equal to the reference voltage Ref (virtual ground due to the gain of the error amplifier EA) but it is dragged by the voltage signal Vout at the terminal OUT of the controller 20. The output terminal of the error amplifier EA, corresponding to the second inner terminal COMP, thus suddenly rises upwards with a speed proportional to the parameter GBWP (Gain Bandwidth Product) of the error amplifier EA and it saturates beyond the height of the driving signals PWM produced by the control modules 21.

In FIG. 2, the index j indicates the different phases of the converter connected to the controller 20, which, as previously described, comprise a High Side switch SWhs, inserted between an input voltage Vin and a switch node X (or phase node), and a Low Side switch SWls, inserted between the phase node X and ground GND, as well as an inductor L, inserted between the phase node X and the terminal OUT of the converter 1 whereon there is an output voltage value Vout, as well as a capacitor Cout inserted between the terminal OUT and ground GND.

The driving signals PWM set the turn on and off times of the switches SWhs and SWls. In particular, when the driving signal PWM is at a high value, or "1", then the High Side switch SWhs is closed and the Low Side switch SWls is open. In a dual way, if the driving signal PWM is at a low value, or "0", then the High Side switch SWhs is open and the Low Side switch SWls is closed.

Thanks to the configuration of the controller 20 shown in FIG. 2, the current $I_L$ flowing in each inductor L of each phase of the converter is read by the controller 20 through the scale factor K.

Although advantageous under several aspects, this known solution shows two important problems.

1) Even if the controller 20 realizes a sudden and quick movement of the inner terminal COMP (further to a Load Transient), each phase responds in reality only marginally to this Load Transient and does not completely contribute to sustain the voltage value Vout required at output due to the presence of the interleaving phase shifts of the phases themselves.

2) The speed with which the inner terminal COMP moves (a function of the parameter GBWP of the error amplifier EA) influences the speed at which the phases driven by the controller 20 turn on or turn on again further to a Load Transient.

The first problem can be immediately linked to the choice of the time constant of the controller 20, which is equal to Cd*Rfp where:

the value of the resistor Rfb is chosen so as to program a desired droop effect, i.e., a departure of the voltage signal Vout from a value of the reference given by $K*I_{TOT}*Rfb$, with K being generally chosen so as to determine a maximum possible value of supplied current; and the value of the supplemental capacitor Cd is chosen as high as possible so as to reduce the impedance of the parallel connection between itself and the resistor Rfb in the case of a Load Transient.

However if the value of the supplemental capacitor Cd is too high, its derivative action also occurs in the steady state, i.e., in the absence of a Load Transient, by substantially amplifying the ripple of the voltage Vout (which is a signal with a value equal to about 10 mV and recurring at frequency n*Fsw, with n being the number of phases of the converter). If this occurs, the converter becomes unstable.

In other words, for a correct operation of the controller 20 the following relation is always to be respected.

$$1/2\pi Rfb*Cd > n*Fsw$$

where Rd is the resistance value of the resistor Rd, Cd is the capacitance value of the capacitor Cd, and n*Fsw is the frequency of the signal Vout.

All this limits the movement of the inner terminal COMP for which each phase with a driving signal PWM higher than a control voltage in the instant when there is a Load Transient is only marginally turned on, as shown in FIG. 3.

In particular, this figure shows that the current of the inductor of the phase F4 is only marginally interested by the Load Transient, so only three phases out of four contribute to the rise of the output voltage value Vout. This situation is valid in a general way: only n−1 phases respond to a current change associated with a Load Transient, with at least one phase remaining "lazy".

The second problem is instead associated with the repeatability of the parameter GBWP of the error amplifier EA of the controller 20. It is known that this parameter GBWP depends on a great number of technological parameters such as oxide thickness, lithographic tolerances, diffusivity of dopants, etc. Apart from the variance with the junction temperature, a departure of at least +/−50% from a nominal value of the parameter GBWP of an amplifier is a realistic situation.

Thus, considering an error amplifier EA with nominal GBWP of 30 MHz (which corresponds to a value of A0 equal to 100 dB and to a pole at 300 Hz), practically, the value of the parameter GBWP could vary between 15 MHz and 45 MHz.

By repeating the simulations on the known controller 20 with error amplifiers EA having the two extreme values indicated above for the parameter GBWP, the patterns shown in FIGS. 4A and 4B, respectively, are obtained, which highlight the dependency of the change of the output voltage Vout on the real value of the parameter GBWP of the error amplifier EA.

It thus occurs that, if for GBWP=45 MHz three phases out of four respond to the Load Transient, for GBWP=15 MHz, only two phases out of four respond to the same Load Transient. Thus the fall value of the output voltage Vout of the converter passes from 110 mV (with GBWP of 45 MHz) to 125 mV (with GBWP of 15 MHz).

SUMMARY OF THE INVENTION

It is an object of the present invention to provide a control method, and a corresponding controller, for a converter of the multiphase interleaving type having such structural and functional characteristics as to ensure that the output voltage value follows sudden load transients, so as to overcome the limits and drawbacks that affect known converters.

Another object of the present invention is to provide a control method, and a corresponding controller, that force the phases of the multiphase interleaving converter so that all respond at the same time to a load transient, substantially interrupting and recovering the interleaving driving mechanism.

One embodiment of the present invention provides a method for controlling a converter of the multiphase interleaving type. According to the method, there is detected when a change of a load applied to an output terminal of the converter occurs. All phases of the converter are simultaneously turned on, and a driving interleaving phase shift is recovered so as to restart a normal operation of the converter.

Another embodiment of the present invention provides a controller for a converter of the multiphase interleaving type. The controller includes at least one input terminal connected to an output terminal of the converter, at least one output terminal connected to phases of the converter, at least one detector of a load transient applied to the output terminal of the converter, and an output comparator. The output comparator has at least one input terminal receiving an inner signal of the converter, and an output terminal connected to the output terminal of the controller for generating a spurious driving signal for the phases of the converter.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawings.

The present invention starts from the consideration that the problems of response to sudden load changes (or Load Transients) applied to a converter of the multiphase interleaving type are mainly linked to the interleaving driving mechanism which shifts the response of the single phases of the converter; phase shift is an obstacle against a quick response of the converter itself. In particular, it has been considered how the ideal response to a Load Transient by the converter is that all the phases respond at the same time and how exactly the interleaving phase shift adopted for the driving of the phases does not allow their simultaneous turn on and is thus responsible for at least one "lazy" phase.

Figure 1A:
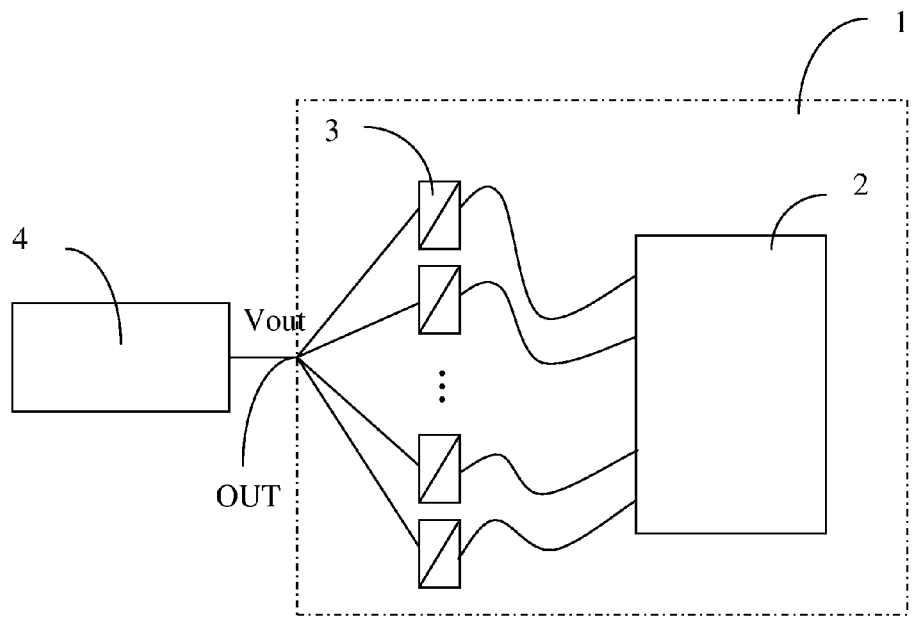
FIGS. 1A and 1B show a known converter of the multiphase interleaving type.
Figure 1B:
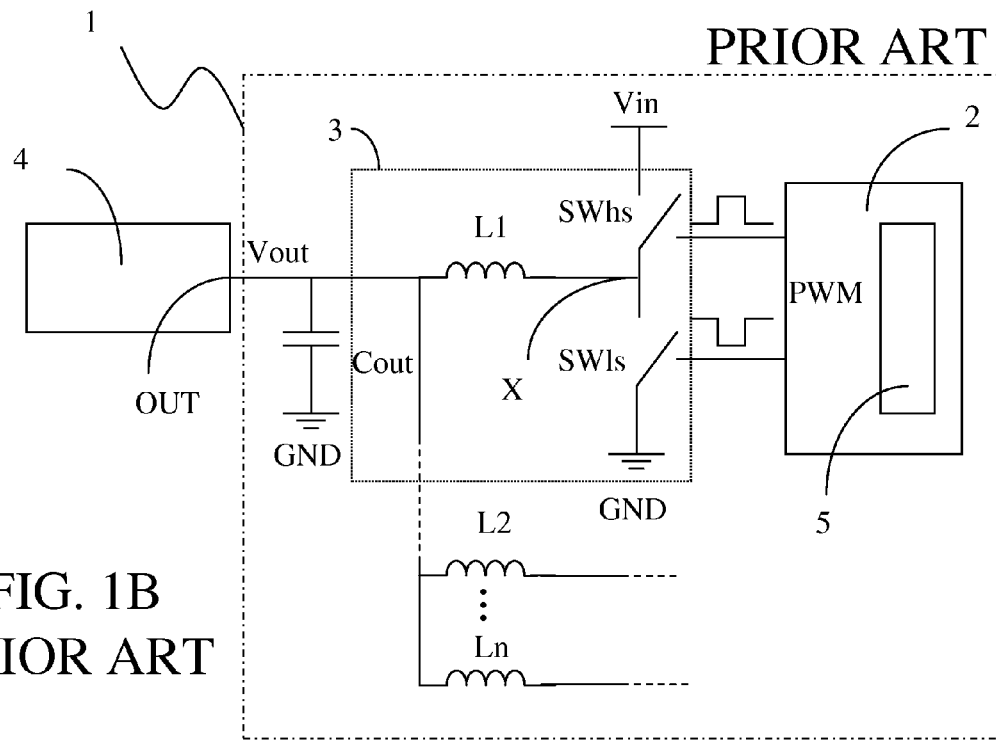
Figure 2:
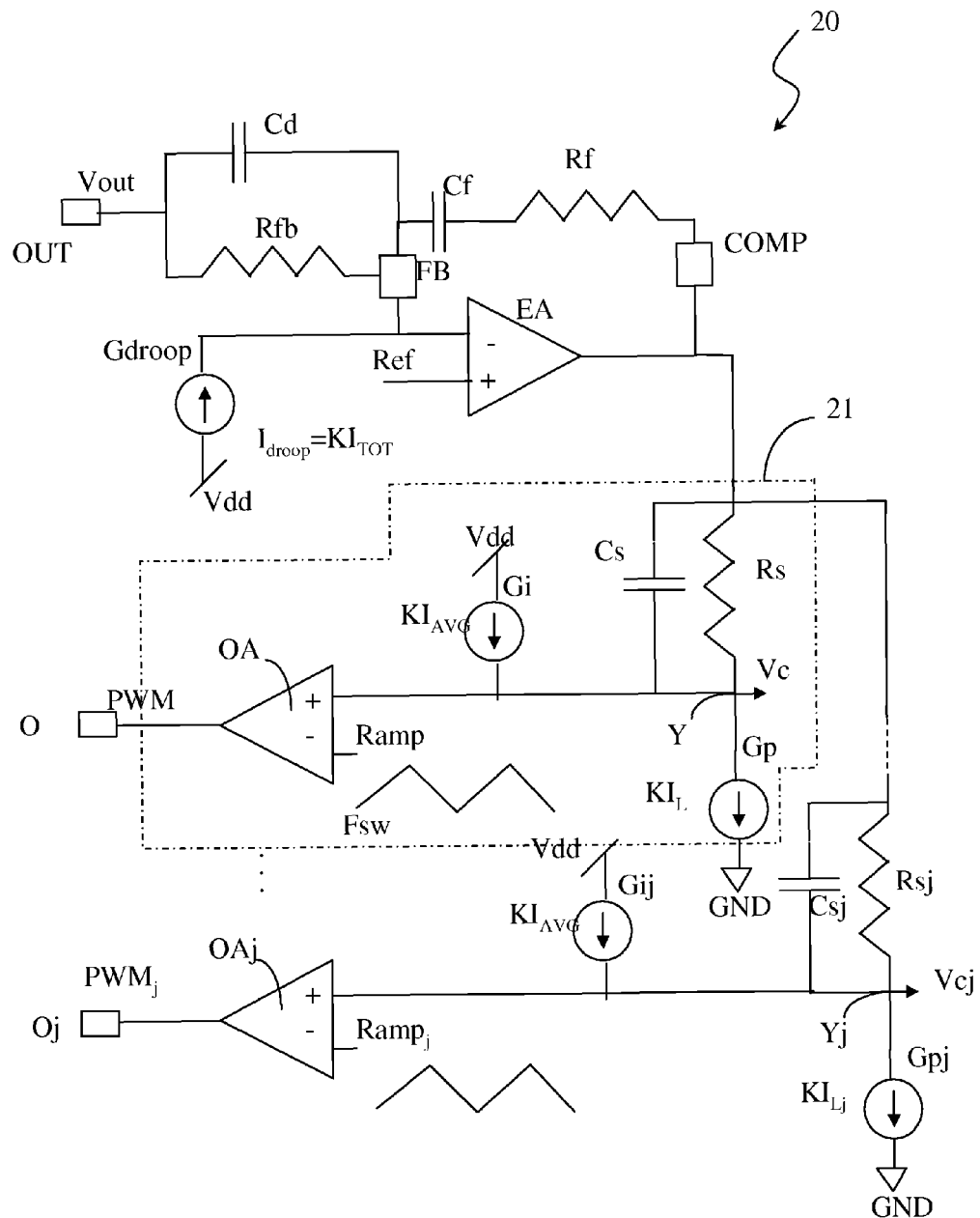
FIG. 2 shows a known controller for a converter of the multiphase interleaving type.
Figure 3:
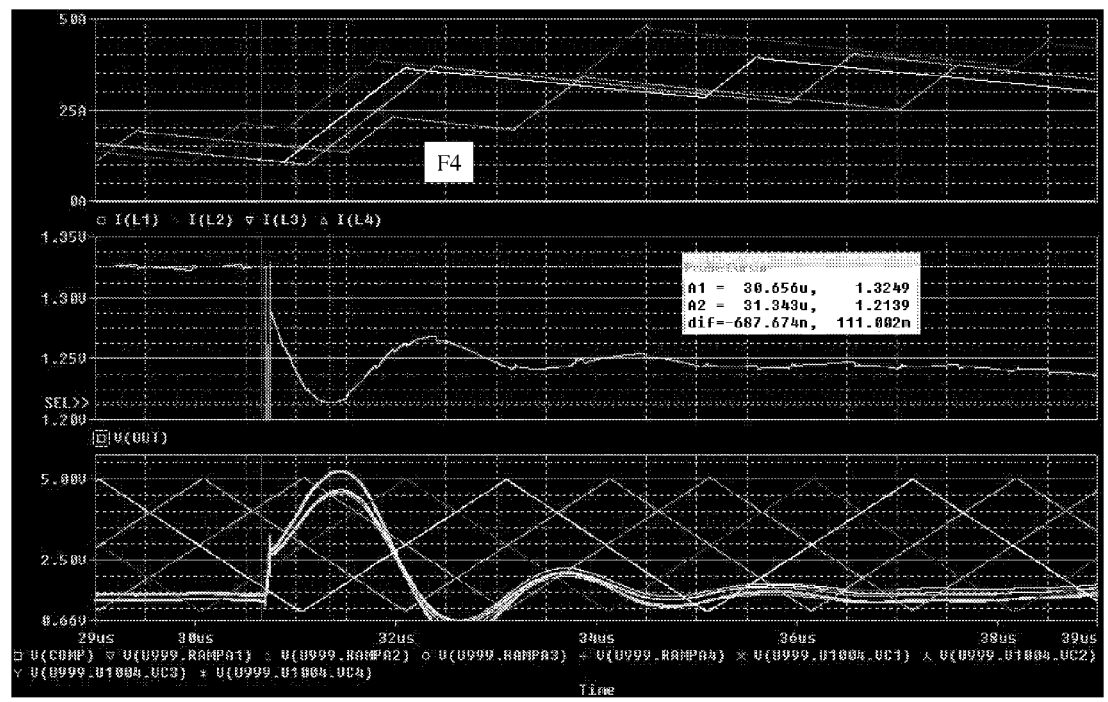
FIGS. 3, 4A and 4B show the patterns of internal signals of a known converter of the multiphase interleaving type under different operation conditions.
Figure 4A:
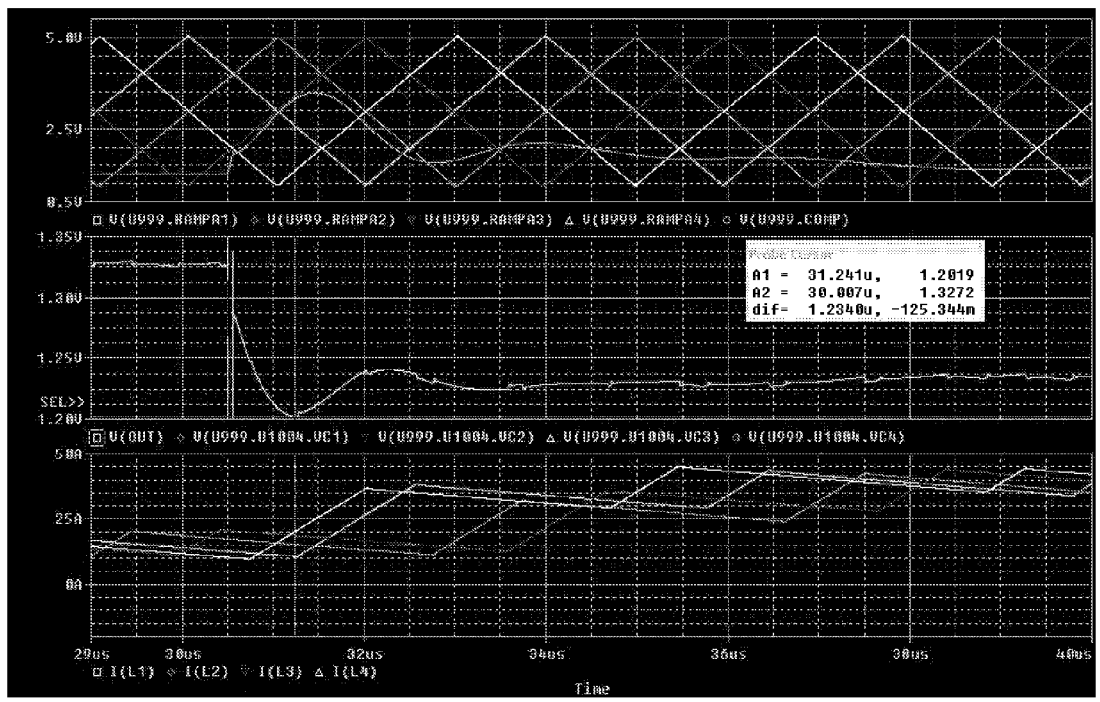
Figure 4B:
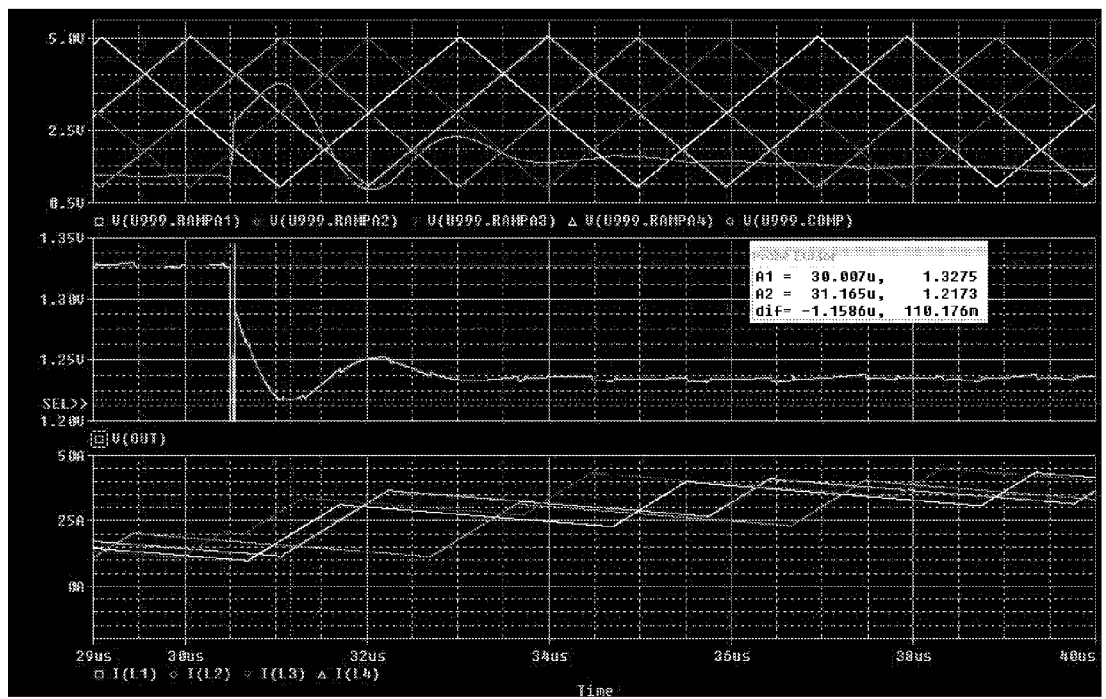

Moreover, the present invention has taken into due consideration the importance of minimizing the time interval between the instant when there is the Load Transient and the effective turn on of all the phases. This time interval in a conventional converter structure of the multiphase interleaving type, with particular reference to the controller 20 of FIG. 2, widely depends on the speed at which the inner terminal COMP rises in voltage beyond a voltage level of the driving signals PWM of the phases. The speed of this inner terminal COMP depends on the parameter GBWP of the error amplifier EA.

Advantageously according to the present invention, a method is proposed for controlling a converter of the multiphase interleaving type that includes the steps of:

1) detecting when a load change applied to an output terminal of the converter (a Load Transient) occurs;

2) simultaneously turning on all the N phases of the converter, without modifying their gain, in particular zeroing the temporal phase shift of the interleaving driving; and 3) recovering the phase shift of this interleaving driving, so as to restart a normal operation of the converter.

In an illustrative embodiment, the step of detecting the Load Transient comprises detecting the negative derivative of the voltage signal Vout at the output terminal of the converter and generating a detection impulse signal LTPULSE in correspondence with the detected Load Transient.

In a preferred embodiment, the control method according to the present invention also comprises a regulation step of this detection impulse signal LTPULSE.

Moreover, in the illustrative embodiment the step of simultaneously turning on all the N phases of the converter comprises generating a spurious driving signal PWM_BOOST that is applied to all the phases and generated by a comparison of a control voltage signal PWM of a phase or an inner voltage signal COMP of the converter with a control signal RAMPA_BOOST, with this control signal RAMPA_BOOST being zeroed in correspondence with the detection impulse signal LTPULSE.

Finally, in the illustrative embodiment the step of recovering the interleaving driving phase shift provides a comparison step of the OR type between the spurious driving signal PWM_BOOST and the driving signal PWM of each phase, with the recovery of the normal operation of the converter occurring in an automatic way once the spurious driving signal PWM_BOOST is ended.

Figure 5:
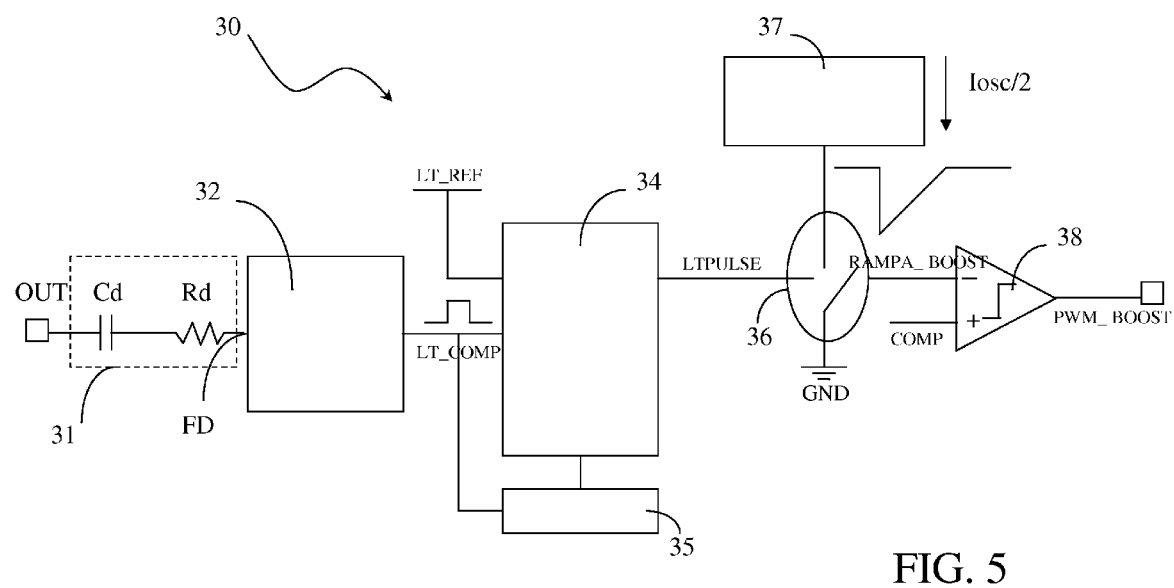
FIG. 5 shows a controller for a converter of the multiphase interleaving type according to one embodiment of the present invention.

This method for controlling a converter of the multiphase interleaving type is realized by a controller according to one embodiment of the present invention, as shown in FIG. 5.

The controller 30 comprises a Load Transient detector 32 having an input terminal FD connected, by a network 31 comprising the series of a capacitor Cd and a resistor Rd, to an OUT terminal of the converter of the multiphase interleaving type for the connection for example with a CPU.

The Load Transient detector 32 has an output terminal LT_COMP connected to a flip-flop 34, having in turn an input terminal connected to an inner voltage reference LT_REF and an output terminal suitable for supplying a switch 36 with a detection signal LTPULSE. By way of illustration, hereafter reference will be made to the signals and to the terminals where these signals are present by using the same references.

The switch 36 is inserted between an oscillator 37, which is suitable for supplying a current signal Iosc/2, and a voltage reference, in particular ground GND, and has an output terminal RAMPA_BOOST that is connected to a first input terminal, in particular an inverting one, of an output comparator 38. The output comparator 38 has a second input terminal, in particular a non-inverting one, that receives a signal COMP, which corresponding to the signal at the homonymous inner terminal of the converter of the multiphase interleaving type, as described above, and an output terminal PWM_BOOST.

The controller 30 also comprises a regulation circuit 35 that is connected to the Load Transient detector 32, in particular to the terminal LT_COMP, and to the flip-flop 34.

Figure 6:
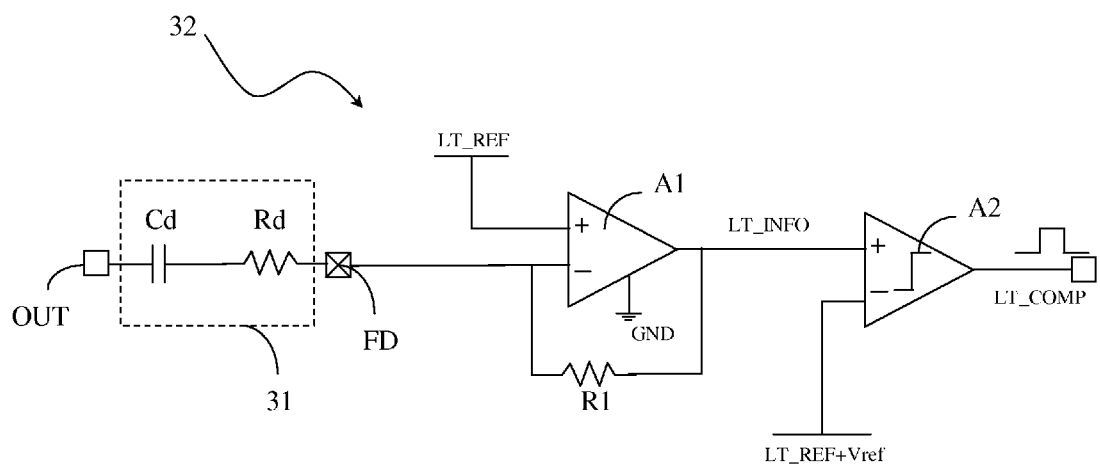
FIG. 6 shows greater detail of a portion of the controller of FIG. 5.

In particular, as shown in FIG. 6, the Load Transient detector 32 comprises an input amplifier A1, in particular an operational amplifier, connected to ground GND, having a first input terminal, in particular a non-inverting one, connected to the inner voltage reference LT_REF, a second input terminal, in particular an inverting one, connected to the terminal FD and thus, through the network 31, to the terminal OUT, as well as an output terminal, LT_INFO feedback connected to the second input terminal through a resistor R1.

The Load Transient detector 32 also comprises an output amplifier A2, in particular a threshold comparator, having a first input terminal, in particular a non-inverting one, connected to the output terminal LT_INFO of the input amplifier A1, a second input terminal, in particular an inverting one, connected to a voltage reference equal to the inner voltage reference LT_REF summed with a "neat" triggering voltage Vref of the threshold comparator A2, as well as an output terminal, LT_COMP.

In substance, the Load Transient detector 32 is a threshold deriving circuit in which the input amplifier A1 detects the derivative of the voltage signal Vout at the terminal OUT of the controller 30 through the network 31 comprising the resistor Rd and the capacitor Cd connected to the terminal FD, with the value of the inner voltage reference LT_REF determining the triggering of the output amplifier A2 in correspondence with the detection of the negative derivative of the voltage signal Vout.

It is also possible to introduce, into the Load Transient detector 32, two output amplifiers having respective input terminals connected to inner voltage references chosen so as to cause their triggering on the detection of the positive, and respectively negative, derivative of the voltage signal Vout.

Figure 7:
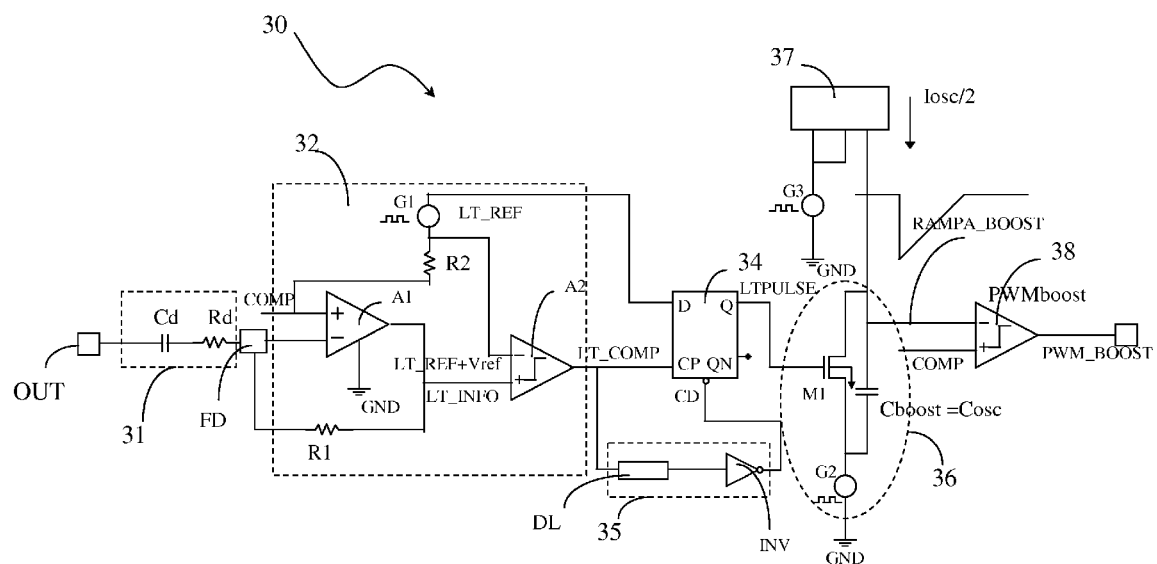
FIG. 7 shows greater detail of the controller of FIG. 5 according to a preferred embodiment of the present invention.

A preferred embodiment of the controller 30 is shown in greater detail in FIG. 7.

As already seen, the controller 30 has a connection terminal OUT, for example for a CPU, connected, by the network 31 composed of the capacitor Cd and the resistor Rd, to the terminal FD, which is in turn connected to the Load Transient detector 32.

In particular, the Load Transient detector 32 comprises the amplifier A1 having a first input terminal, a non-inverting one, connected, by a resistor R2 to a first generator G1 of the inner voltage reference LT_REF, a second input terminal, an inverting one, connected to the terminal FD, and an output terminal. The first generator G1 is connected between a first input terminal D of the flip-flop 34 and a first input terminal, an inverting one, of the comparator A2, which has a second input terminal, a non-inverting one, connected to the output terminal of the amplifier A1 and an output terminal suitable for supplying a signal LT_COMP to a second input terminal CP of the flip-flop 34, as well as to the regulation circuit 35.

In particular, the regulation circuit 35 comprises a delay element DL inserted between the output terminal of the comparator A2 and an inverter INV, which is in turn connected to a control terminal CD of the flip-flop 34, which has at least one output terminal Q suitable for supplying the switch 36 with the detection impulse signal LTPULSE.

The switch 36 comprises a transistor M1 having a first conduction terminal connected to the oscillator 37, a second conduction terminal connected to a second generator G2, which is in turn connected to ground GND, and a control terminal connected to the output terminal Q of the flip-flop 34. The switch 36 also comprises a capacitor Cboost inserted, in parallel to the transistor M1, between the oscillator 37 and the second generator G2.

The transistor M1 and the capacitor Cboost are also connected to a first terminal, an inverting one, of the output comparator 38, which has a second input terminal that receives the signal COMP, as well as an output terminal suitable for supplying the spurious driving signal PWM_BOOST.

The oscillator 37 and the switch 36 generate a control signal RAMPA_BOOST having the form indicated in the figure, which is applied to the first input terminal of the output comparator 38.

Figure 8A:
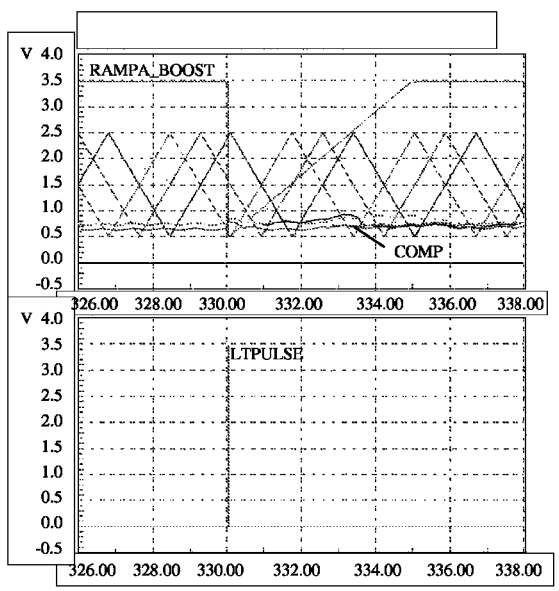
FIGS. 8A and 8B show the patterns of internal signals of the controller of FIG. 5.
Figure 8B:
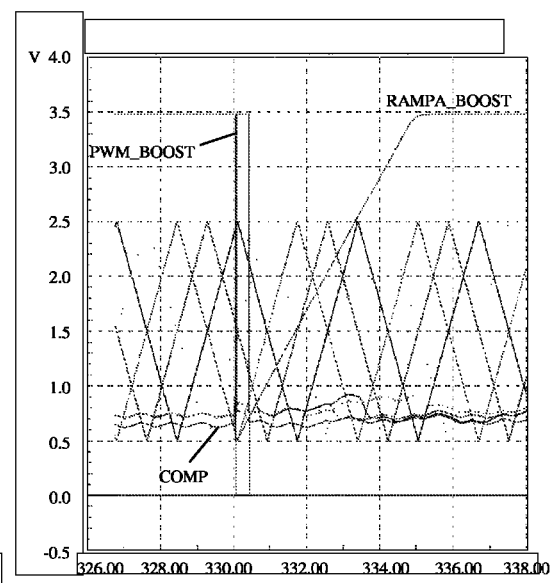

In fact, advantageously according to this embodiment of the present invention, the Load Transient detector 32 is only sensitive to the negative derivative of the output voltage signal Vout at the terminal OUT of the controller 30. In particular, when the comparator A2 triggers further to the detection of the derivative of the voltage signal Vout, the flip-flop 34 creates a detection impulse signal LTPULSE which closes the switch 36, zeroing in this way the control signal RAMPA_BOOST, as shown in FIGS. 8A and 8B.

Moreover, the detection impulse signal LTPULSE generated by the flip-flop 34 is regulated by the delay introduced by the delay element DL of the regulation circuit 35.

Moreover, as already seen in connection with the conventional controller, to not also derive the residual ripple of the signal Vout (which is a signal with frequency equal to N*Fsw), the network 31 is sized so as to respect the following relation.

$$1/2\pi Rd*Cd > j*Fsw$$

where Rd is the resistance value of the resistor Rd, Cd is the capacity value of the capacitor Cd, and N*Fsw is the frequency of the Vout signal.

The ripple of the output voltage signal Vout is about 10 mV peak-to-peak, while the voltage drop DVout further to a Load Transient is about 100 mV. Moreover, in the case of a Load Transient, it is so quick as to consider the impedance associated with the capacitor Cd of the network 31 almost void. Thus, considering that the current value Id crossing the resistor Rd is equal to Id=DVout/Rd, it is possible to size the resistor Rd so that the following relation occurs.

$$DVout/Rd \times Rdd > Vref$$

where Rdd is the resistance value of the feedback resistor, and Vref is the "neat" triggering voltage value of the comparator A2 (equal to G1*R2, with reference to FIG. 7).

Thus it is obtained that the resistance value of the resistor Rd must respect the following relation.

$$Rd < DVout \times Rdd/Vref$$

In substance, the detection impulse signal LTPULSE is generated by the flip-flop 34 in the case of a quick load transient; the controller 30 realizing in this way the step of detecting the Load Transient.

Further to the generation of the detection impulse signal LTPULSE, the voltage across the capacitor Cboost (suitably chosen with a value equal to a capacitance Cosc used to generate the triangular ramps of the control voltage signals PWM of the phases of the converter connected to the controller 30) is zeroed. The output comparator 38 thus generates a spurious driving signal PWM_BOOST, of the impulse type, by comparing the control voltage signal PWM of a phase or the voltage signal COMP applied to its second input terminal with the control signal RAMPA_BOOST applied to its first input terminal. The duration of the spurious driving signal PWM_BOOST depends on the controller 30 (i.e., on the control voltage). In fact, the spurious driving signal PWM_BOOST is the signal of the output terminal of the comparator 38; this comparator 38 compares the control signal RAMPA_BOOST with the voltage signal COMP, which is in turn the output terminal signal of the controller, i.e., the control voltage value. This control voltage is substantially a signal carrying the information on how much energy is necessary to be transferred from the input terminal to the output terminal of the converter. The dependency of the duration of the spurious driving signal PWM_BOOST on the control voltage thus allows control of the energy transferred by the converter.

Figure 9:
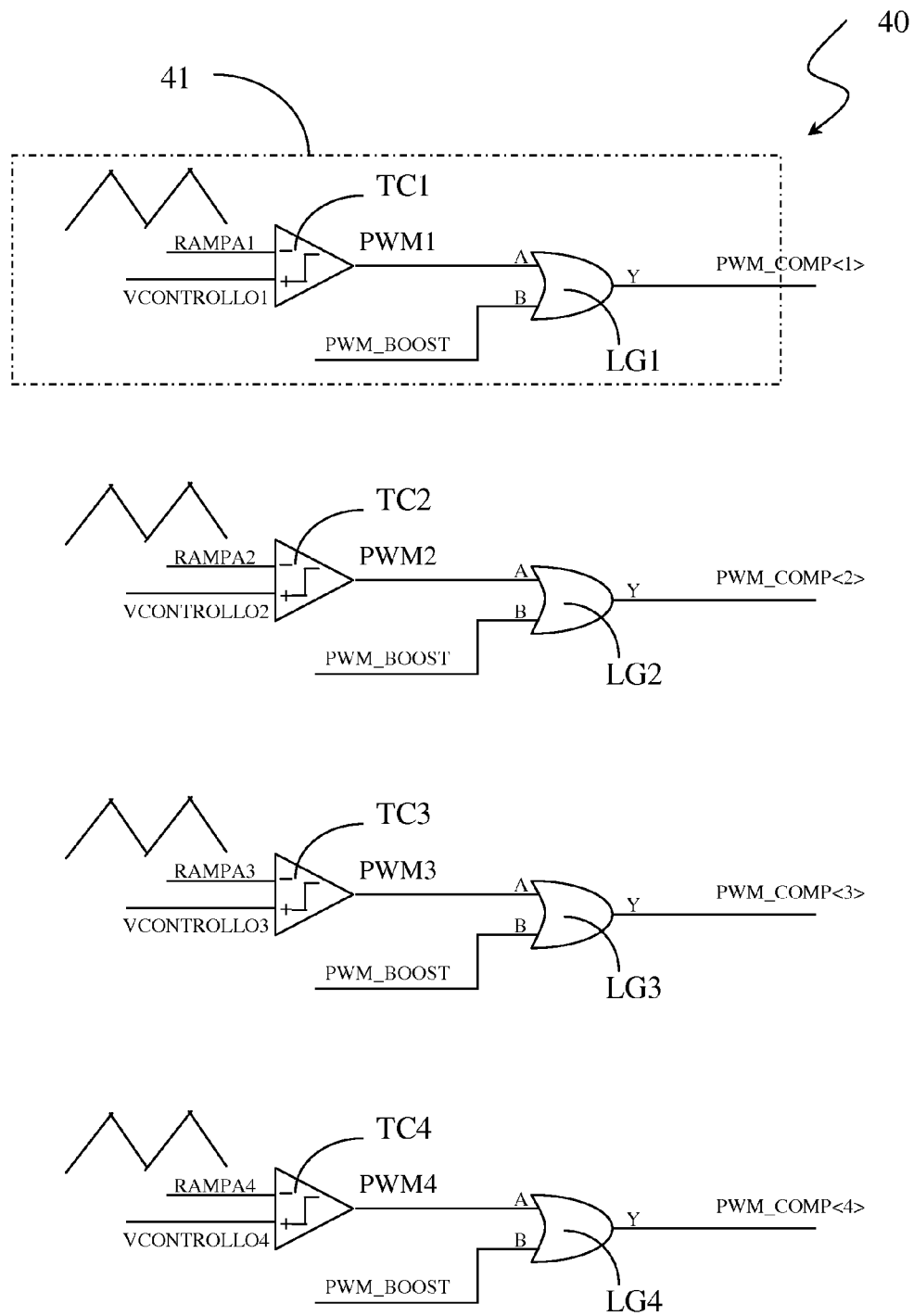
FIG. 9 shows an inner configuration of the controller of FIG. 5.
Figure 10A:
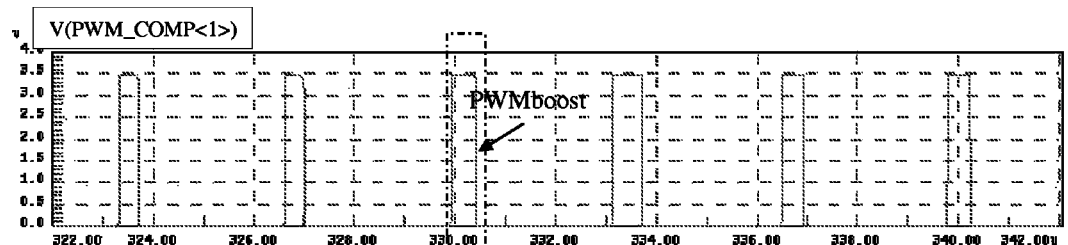
FIGS. 10A to 10E show the patterns of internal signals of the inner configuration of FIG. 9.
Figure 10B:
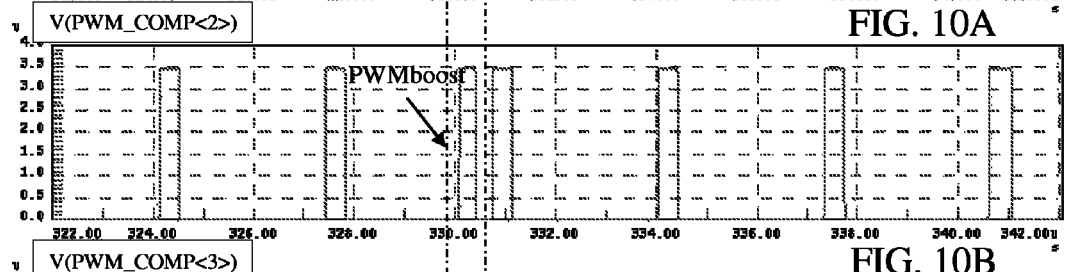
Figure 10C:
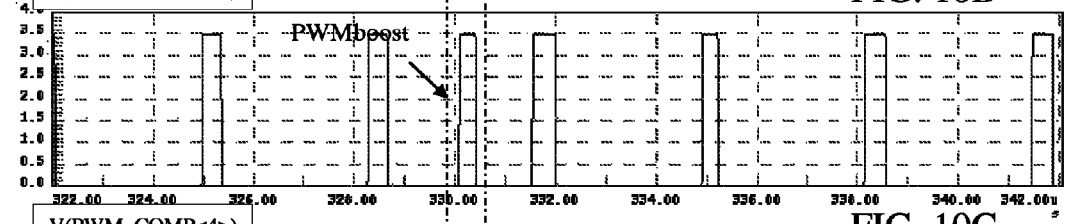
Figure 10D:
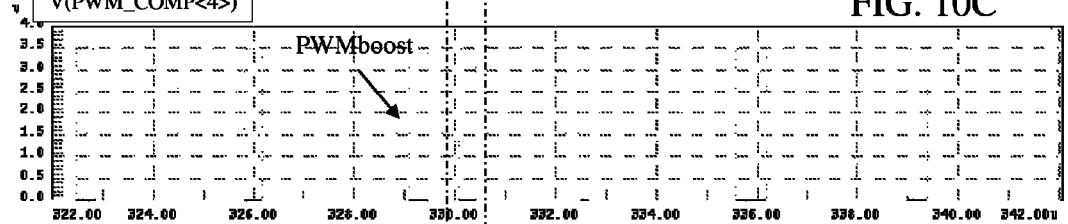
Figure 10E:
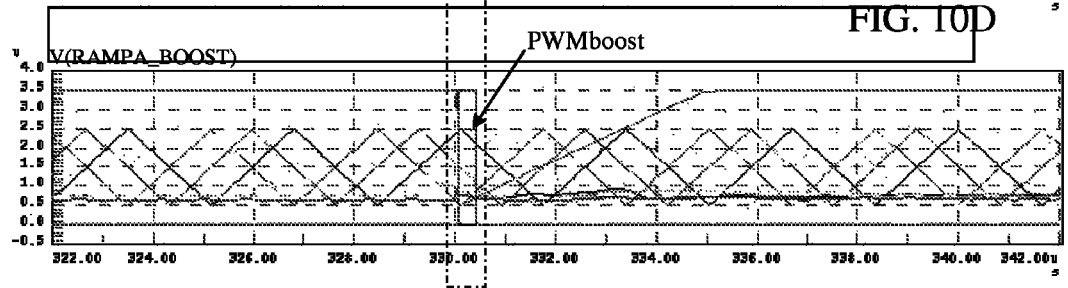

The spurious driving signal PWM_BOOST generated by the controller 30 is used to simultaneously turn on the High Side switches of all the phases of the converter connected to the controller 30, zeroing the interleaving phase shift of the driving of these phases, in particular through a plurality of signals PWM_COMP generated by an OR driving architecture 40, which is shown in FIG. 9.

The driving architecture 40 shown in FIG. 9 relates, as a non-limiting example, to the case of four phases for which it generates four driving signals, PWM_COMP<1> to PWM_COMP<4>. It comprises a plurality, in this illustrative example four, of driving sub-systems 41, each comprising a threshold comparator TC having a first input terminal, an inverting one, receiving a ramp signal RAMP of the corresponding phase, a second input terminal, a non-inverting one, receiving a control voltage signal VCONTROLLO and an output terminal suitable for supplying a first input terminal A of a logic gate LG of the OR type with a signal PWM. The logic gate has a second input terminal B that receives the spurious driving signal PWM_BOOST and an output terminal Y suitable for supplying the real driving signal PWM_COMP.

In this way, the simultaneous turn on of the phases occurs by realizing an OR of the signals PWM and the spurious driving signal PWM_BOOST thanks to the driving architecture 40.

Considering that the ramp signals (RAMPA1 to RAMPA4) are constructed by charging and discharging a capacitance Cosc with a current Iosc, then the control signal RAMPA_BOOST is advantageously created with a slope equal to half the isosceles-triangle-shaped ramps of the driving signals PWM. In particular, the ramp signals RAMPA1 to RAMPA4 are isosceles-triangle-shaped ramps which, compared with the control voltage signals VCONTROLLO1 to VCONTROLLO4 create driving signals of the PWM type by the comparators TC1 to TC4.

Advantageously according to this embodiment of the present invention, the controller 30 thus comprises a capacitor Cboost with a capacitance value equal to Cosc and the oscillator 37 supplies a load current equal to Iosc/2.

The fact that the slope of the control signal RAMPA_BOOST is chosen to be equal to half the ramps of the driving signals PWM ensures continuity in the control action of the controller 30. All this is mathematically equivalent to a non-varying loop gain of the overall system comprising the controller 30 and the corresponding converter.

At this point, the recovery of the interleaving phase shift is to be provided for the driving of the phases during the normal operation of the converter.

Advantageously, by using the controller 30 according to this embodiment of the present invention the recovery of the interleaving phase shift is automatic since it has never been interrupted. In particular, when the spurious driving signal PWM_BOOST ends, the phases of the converter start to work again following the interleaving phase shift of the driving signals PWM.

This automatic recovery mechanism is shown in FIGS. 10A-10E where the results of simulations carried out on a converter of the multiphase interleaving type with four phases are shown.

In particular, from these figures it is clear how the driving signals PWM update the interleaving phase shift, once the response to the Load Transient has ended.

Figure 11A:
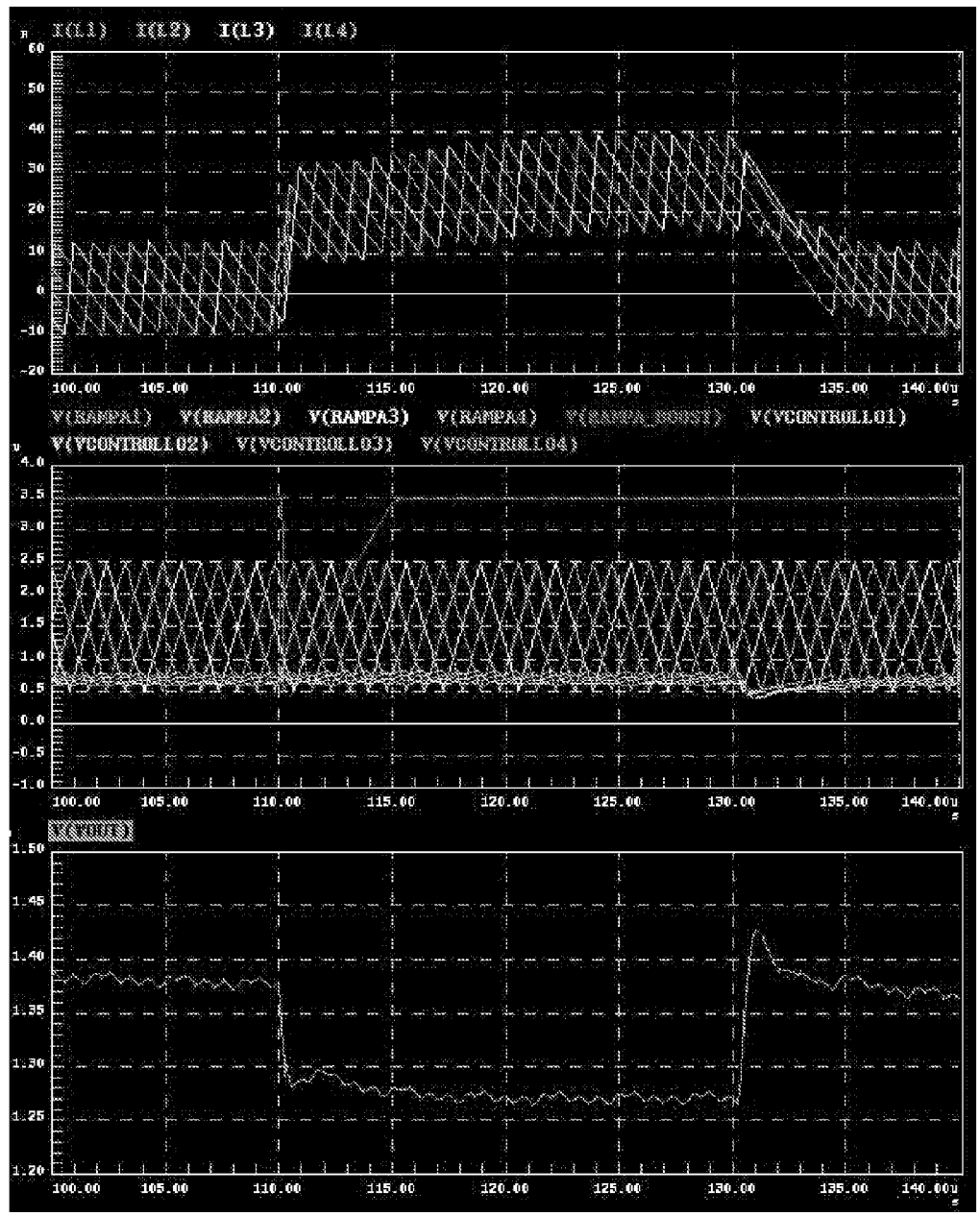
FIGS. 11A and 11B show the patterns of internal signals of the controller of FIG. 5.
Figure 11B:
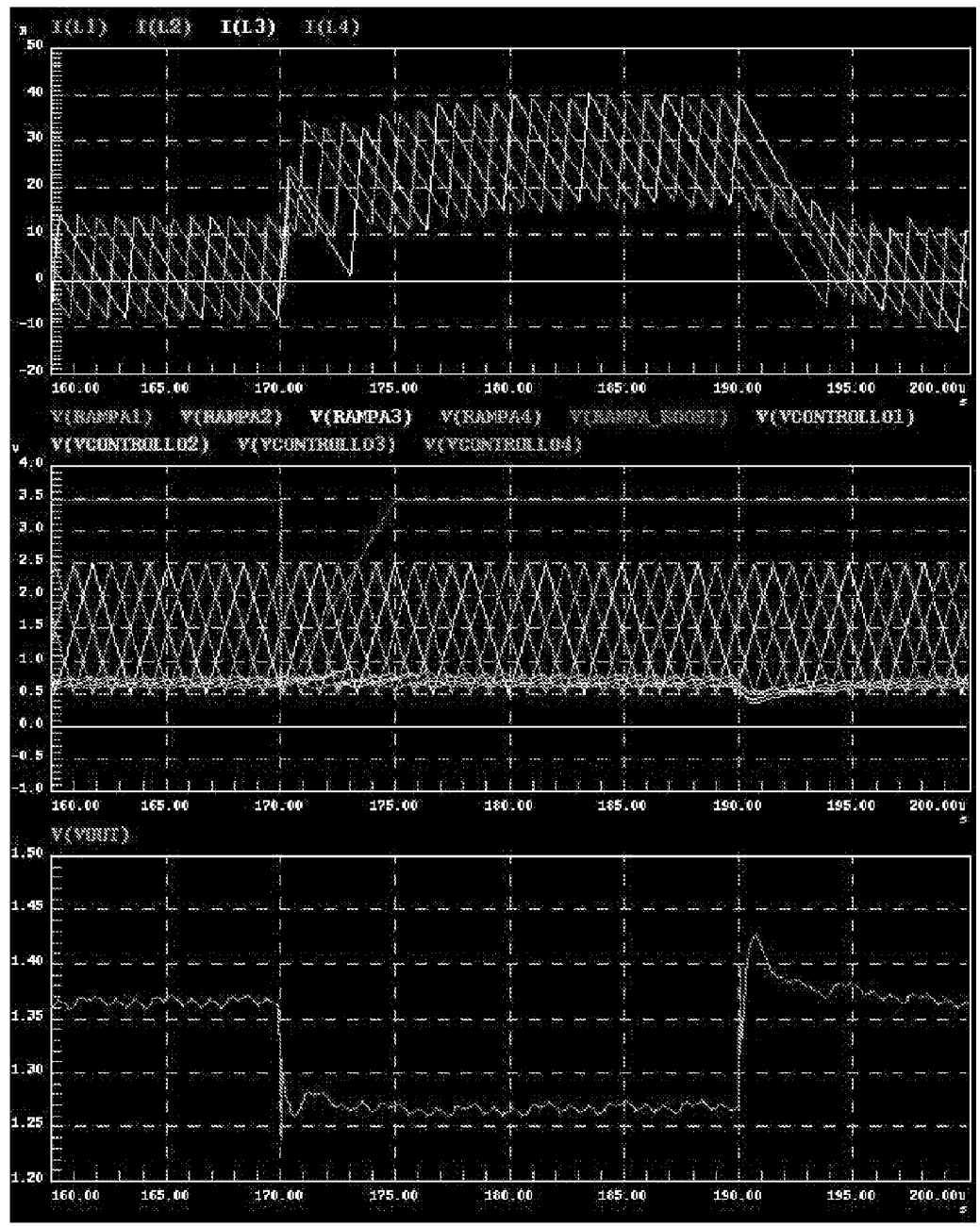

Accordingly, the controller 30, after having detected a Load Transient through the Load Transient detector 32, resets the control signal RAMPA_BOOST and compares it with any control voltage, generating a spurious driving signal PWM_BOOST of the impulse type which "resets" the driving signals PWM thanks to the OR driving architecture 40. In this way, in response to a Load Transient, all the phases are turned on by the spurious driving signal PWM_BOOST, enhancing the current level made available for the load connected to the terminal OUT, as shown in FIGS. 11A and 11B for Load Transients of 100 A in 300 ns and 100 A in 50 ns, respectively.

Moreover, advantageously the recovery of the interleaving driving is automatic, once the Load Transient has ended and the control signal RAMPA_BOOST has risen again, thanks to the driving architecture 40 of the OR type.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A method for controlling a converter of the multiphase interleaving type, the converter including a plurality of phases, the method comprising the steps of:
    detecting when a change of a load applied to an output terminal of the converter occurs by detecting a derivative of a voltage signal at the output terminal;
    when the derivative indicates a change of the load applied to the output terminal of the converter, generating a detection impulse signal;
    in response to the detection impulse signal, simultaneously turning on all of the phases of the converter; and
    recovering a driving interleaving phase shift so as to restart a normal operation of the converter,
    wherein the detecting step further comprises regulating the detection impulse signal based on a delay introduced by a delay element.

2. The method according to claim 1, wherein the detecting step comprises detecting a negative derivative of the voltage signal at the output terminal.

3. A method for controlling a converter of the multiphase interleaving type, the converter including a plurality of phases, the method comprising the steps of:
    detecting when a change of a load applied to an output terminal of the converter occurs by detecting a derivative of a voltage signal at the output terminal;
    when the derivative indicates a change of the load applied to the output terminal of the converter, generating a detection impulse signal;
    in response to the detection impulse signal, simultaneously turning on all of the phases of the converter; and
    recovering a driving interleaving phase shift so as to restart a normal operation of the converter,
    wherein the simultaneously turning on step comprises generating a spurious driving signal that is applied to all of the phases of the converter by comparing one of a control voltage signal of the phases and an inner voltage signal of the converter with a control signal generated within the controller, the control signal generated within the controller being zeroed by the controller in response to the detection impulse signal.

4. The method according to claim 3, wherein the recovering step comprises making an OR-type comparison between the spurious driving signal and PWM driving signals of the phases.

5. A controller for a converter of the multiphase interleaving type, the controller comprising:
    at least one input terminal connected to an output terminal of the converter;
    at least one output terminal connected to phases of the converter;
    at least one detector of a load transient applied to the output terminal of the converter;
    an output comparator having at least one input terminal receiving an inner signal of the converter, and an output terminal connected to the output terminal of the controller for generating a spurious driving signal for the phases of the converter;
    a flip-flop having a first input terminal connected to an output terminal of the detector, and at least one output terminal; and
    a switch connected to the output terminal of the flip-flop, the switch having an output terminal connected to at least one input terminal of the output comparator,
    wherein the flip-flop generates on its output terminal an impulse signal in correspondence with the load transient detected by the detector.

6. The controller according to claim 5, wherein the detector detects a negative derivative of the voltage signal on the output terminal of the converter.

7. The controller according to claim 5, further comprising an oscillator connected to the switch for supplying the switch with a current signal, the oscillator and the switch generating a control signal which is zeroed in correspondence with the impulse signal and is applied to the output comparator.

8. The controller according to claim 7, wherein the switch comprises a transistor having a first conduction terminal connected to the oscillator, a second conduction terminal connected to a second generator, and a control terminal connected to the at least one output terminal of the flip-flop.

9. The controller according to claim 8, wherein the switch further comprises a capacitor inserted between the oscillator and the second generator, the transistor and capacitor being connected to a further input terminal of the output comparator.

10. The controller according to claim 9, wherein the capacitor is sized as a capacitor used for generating ramp control voltage signals of the phases of the converter and the oscillator supplies a current value equal to half a current value as used for generating the ramp control voltage signals.

11. The controller according to claim 7, further comprising a driving architecture of the OR type comprising a plurality of driving sub-systems, each including at least one threshold comparator having a first input terminal receiving a ramp control voltage signal of a corresponding phase of the converter, a second input terminal receiving a control voltage signal, and an output terminal for supplying a first input terminal of an OR logic gate with a signal of the PWM type, the OR logic gate having a second input terminal receiving the spurious driving signal and an output terminal for supplying a driving signal of the corresponding phase.

12. The controller according to claim 11, wherein the control signal generated by the switch is a ramp signal having a slope equal to half the ramp control voltage signals of the phases.

13. The controller according to claim 5, further comprising a regulation circuit connected to the detector and to the flip-flop.

14. The controller according to claim 13, wherein the regulation circuit comprises:
    an inverter; and
    a delay element inserted between the output terminal of the detector and the inverter, the inverter being connected to a control terminal of the flip-flop for regulating the impulse signal.

15. A controller for a converter of the multiphase interleaving type, the controller comprising:
    at least one input terminal connected to an output terminal of the converter;
    at least one output terminal connected to phases of the converter;
    at least one detector of a load transient applied to the output terminal of the converter; and
    an output comparator having at least one input terminal receiving an inner signal of the converter, and an output terminal connected to the output terminal of the controller for generating a spurious driving signal for the phases of the converter,
    wherein the detector comprises:
        an input amplifier connected to a first voltage reference, the input amplifier having a first input terminal connected to an inner voltage reference, a second input terminal connected to the input terminal of the controller, and an output terminal feedback connected to the second input terminal through a resistive element; and
        an output amplifier having a first input terminal connected to the output terminal of the input amplifier, a second input terminal receiving a voltage value equal to the sum of the inner voltage reference and a triggering voltage of the output amplifier, and an output terminal supplying a negative derivative of a voltage signal on the output terminal of the converter.

16. The controller according to claim 15, wherein the input amplifier is an operational amplifier.

17. The controller according to claim 15, wherein the output amplifier is a threshold comparator.

18. The controller according to claim 15, further comprising a first generator generating the inner voltage reference, the first generator being directly connected to the first input terminal of the output amplifier and being connected through a second resistive element to the first input terminal of the input amplifier.

19. The controller according to claim 18, wherein the first generator is further connected to an input terminal of a flip-flop.

* * * * *